United States Patent
Weast et al.

(10) Patent No.: US 9,676,250 B2
(45) Date of Patent: Jun. 13, 2017

(54) ADAPTIVE INTERIOR AIR QUALITY CONTROL APPARATUS AND METHODS FOR VEHICLE COMPARTMENT

(71) Applicant: INTEL CORPORATION, Santa Clara, CA (US)

(72) Inventors: John C. Weast, Portland, OR (US); Timothy J. Gresham, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 14/128,558

(22) PCT Filed: Jul. 24, 2013

(86) PCT No.: PCT/US2013/051868
§ 371 (c)(1),
(2) Date: Dec. 20, 2013

(87) PCT Pub. No.: WO2015/012826
PCT Pub. Date: Jan. 29, 2015

(65) Prior Publication Data
US 2015/0032266 A1   Jan. 29, 2015

(51) Int. Cl.
*B60H 1/00* (2006.01)
(52) U.S. Cl.
CPC ......... *B60H 1/008* (2013.01); *B60H 1/00821* (2013.01); *B60H 1/00842* (2013.01);
(Continued)
(58) Field of Classification Search
CPC ................ B60H 1/008; B60H 1/00735; B60H 1/00814; B60H 1/00821; B60H 1/00828;
(Continued)

(56) References Cited

U.S. PATENT DOCUMENTS 4,259,722 A * 3/1981 Iwata .................. B60H 1/008
701/36
5,054,686 A * 10/1991 Chuang ............. B60H 1/00735
454/75
(Continued)

FOREIGN PATENT DOCUMENTS

DE      10320745 A1 * 12/2004 ............. B60H 1/008
JP   1997039560 A    2/1997
(Continued)

OTHER PUBLICATIONS

Espacenet translation of DE10320745A1, Zipp et al, Vehicle Ventilation system, Dec. 2, 2004, 10 pages.*
(Continued)

*Primary Examiner* — Dale W Hilgendorf
(74) *Attorney, Agent, or Firm* — Schwabe, Williamson & Wyatt, P.C.

(57) ABSTRACT

Embodiments of apparatus and methods for adaptively controlling air quality in a vehicle compartment are described. In embodiments, an apparatus may include a sensor interface configured to interface with one or more sensors, disposed at one or more locations at one or more sides or in an interior space of a vehicle compartment, and configured to measure one or more indicators of air quality at the one or more locations. The apparatus may further include one or more airflow controllers configured to adaptively control a plurality of ventilation components of the vehicle compartment to regulate airflow in the interior space, based at least in part on the measured indicators of air quality. Other embodiments may be described and/or claimed.

22 Claims, 6 Drawing Sheets

(52) U.S. Cl.
CPC ..... *B60H 1/00849* (2013.01); *B60H 1/00735* (2013.01); *B60H 1/00814* (2013.01); *B60H 1/00828* (2013.01); *B60H 1/00835* (2013.01); *B60H 1/00871* (2013.01)

(58) Field of Classification Search
CPC ............ B60H 1/00835; B60H 1/00842; B60H 1/00849; B60H 1/00871
See application file for complete search history.

(56) References Cited

U.S. PATENT DOCUMENTS

| | | | | |
|---|---|---|---|---|
| 5,129,192 | A * | 7/1992 | Hannush | B60H 1/00821 454/75 |
| 5,486,138 | A * | 1/1996 | Sorensen | B60H 1/008 454/75 |
| 5,553,775 | A * | 9/1996 | Kato | B60H 1/00842 454/75 |
| 5,980,378 | A * | 11/1999 | Wieszt | B60H 1/008 454/75 |
| 6,298,291 | B1 * | 10/2001 | Davis, Jr. | B60H 1/008 454/75 |
| 6,758,739 | B1 * | 7/2004 | Sangwan | B60H 1/008 454/75 |
| 2005/0192724 | A1 * | 9/2005 | Hendry | B60H 1/00771 701/36 |
| 2007/0243808 | A1 | 10/2007 | Mathur et al. | |
| 2011/0046846 | A1 * | 2/2011 | Prokhorov | B60H 1/008 701/36 |

FOREIGN PATENT DOCUMENTS

| | | |
|---|---|---|
| JP | 2003-011651 A | 1/2003 |
| JP | 2009229397 A | 10/2009 |
| JP | 2012171541 A | 9/2012 |
| KR | 1019990047378 A | 7/1999 |
| KR | 1020130071613 A | 7/2013 |

OTHER PUBLICATIONS

International Search Report and Written Opinion for PCT Application No. PCT/US2013/051868, dated Apr. 22, 104.
International Preliminary Report on Patentability mailed Feb. 4, 2016 for International Application No. PCT/US2013/051868, 11 pages.
Notice of Reason(s) for Rejection mailed Nov. 29, 2016, issued in corresponding Japanese Patent Application No. 2016-519486, 6 pages.
Extended European Search Report mailed Feb. 7, 2017 for European Application No. 13889936A, 7 pages.

* cited by examiner

ADAPTIVE INTERIOR AIR QUALITY CONTROL APPARATUS AND METHODS FOR VEHICLE COMPARTMENT

CROSS REFERENCE TO RELATED APPLICATIONS

The present application is a national phase entry under 35 U.S.C. §371 of International Application No. PCT/US2013/051868, filed Jul. 24, 2013, entitled "ADAPTIVE INTERIOR AIR QUALITY CONTROL APPARATUS AND METHODS FOR VEHICLE COMPARTMENT", which designated, among the various States, the United States of America. The Specification of the PCT/US2013/051868 Application is hereby incorporated by reference.

FIELD OF THE INVENTION

The present disclosure relates generally to the technical field of control systems, and more particularly, to apparatuses and methods for adaptive interior air quality control for vehicle compartment.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Vehicle comfort systems have become indispensable in modern life. Nowadays, passengers may enjoy high-end integrated electronic systems that may enhance their riding experience. Particularly, climate control systems have been pervasively built into all kinds of modern vehicles. Ventilation systems may be necessary to enable climate control in an enclosed space of a vehicle. However, ventilation systems may also exacerbate the contamination of pollutants or noxious odor throughout the vehicle.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
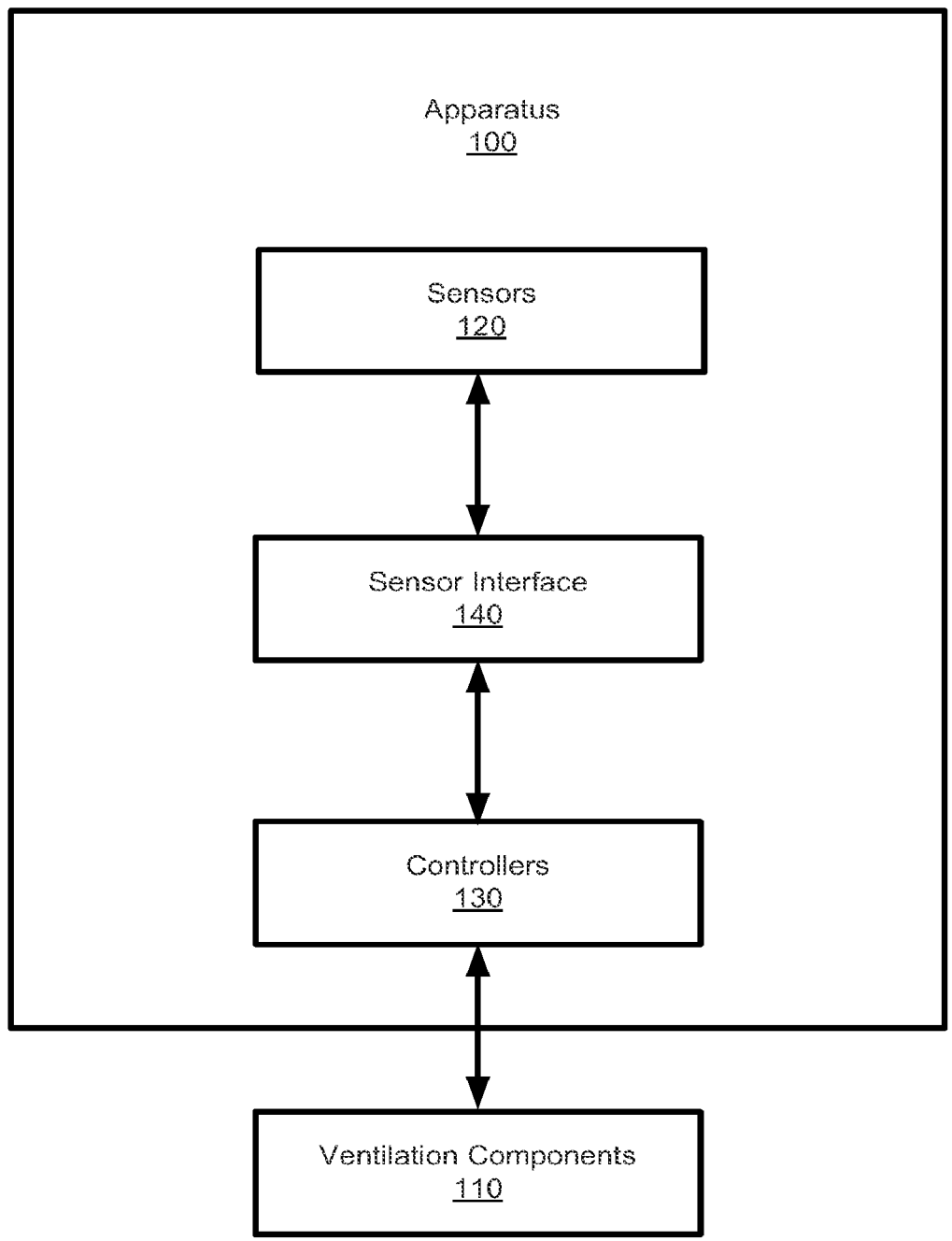
FIG. 1 is a schematic diagram illustrating an example apparatus for adaptively controlling interior air quality of a vehicle compartment, incorporating aspects of the present disclosure, in accordance with various embodiments.

Embodiments of apparatus and methods for adaptive control of air quality in a vehicle compartment are described herein. In embodiments, an apparatus may include a sensor interface configured to interface with one or more sensors, disposed at multiple locations at one or more sides or in an interior space of a vehicle compartment, e.g., an automobile compartment, and configured to measure one or more indicators of air quality, e.g., levels of pollutants, at the plurality of locations. The apparatus may further include one or more airflow controllers configured to adaptively control multiple ventilation components, such as inlets/outlets or closable openings (e.g., windows or sunroof), of the vehicle compartment to regulate airflow in the interior space, based at least in part on the measured indicators of air quality. These and other aspects will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an example apparatus 100 for adaptive air quality control, in accordance with various embodiments, is illustrated. Apparatus 100 may include a number of sensors 120, and one or more airflow controllers 130, coupled with each other via sensor interface 140, as shown. Airflow controllers 130 (hereinafter, simply "controllers 130") may be coupled to ventilation components 110, such as inlets/outlets or closable openings, of a vehicle compartment. As will be described in more detail below, controllers 130 may be incorporated with the teachings of the present disclosure to adaptively control air quality of the interior space of the vehicle compartment, by adaptively controlling the airflow in the interior space, through control of ventilation components 110. In embodiments, controllers 130 may control ventilation components 110, based at least in part on measurements of a number of air quality indicators made by sensors 120. In embodiments, sensors 120 may be fixed or removably disposed at a number of locations at the sides or interior space of the vehicle compartment. Sensor interface 140 may represent a broad range of wired or wireless interfaces including but are not limited, I²C bus, universal serial bus, BLUETOOTH® , and the like. Resultantly, apparatus 100 may enable greater comfort be provided to passengers and drivers situated inside the vehicle compartment.

In embodiments, apparatus 100 may be implemented for vehicle compartments of a variety of vehicles, such as, but not limited to, a car, a truck, a bus, a boat, a ship, a train, or a motorhome. In other embodiments, apparatus 100 may also be implemented for compartments of watercraft, sailcraft, aircraft, hovercraft, spacecraft and/or any vehicle suitable for transporting passengers or cargo.

In embodiments, passengers may include any person or animal that travels in the vehicle, including passengers and operators of the vehicle, such as drivers or pilots. In some embodiments, the vehicle compartment may include cargo, living organisms or chemically sensitive goods, which may require not to be exposed to certain pollutants.

In embodiments, sensors 120 may include different types of sensors configured to measure various air quality indicators. In embodiments, sensor 120 may include sensors configured to measure levels of one or more pollutants affecting air quality. Pollutants may include gases (e.g., including carbon monoxide, methane, ammonia, radon, volatile organic compounds (VOCs), etc.), microbial contaminants (e.g., mold, bacteria), particulates (e.g., suspended particulate matter (SPM), respirable suspended particle (RSP), fine particles, ultrafine particles, soot, or any mass or energy stressor that can induce adverse health conditions or environmental risks. In embodiments, pollutants may include pleasant and unpleasant odors. Pleasant odor may include perfumes. Unpleasant odor may include malodor, stench, reek, and stink. However, the categorization of pleasant or unpleasant odor may be subjective. In embodiments, the categories of pollutants measured by sensor 120 may be customized by a user.

In embodiments, sensors 120 may be stationarily or movably coupled with a vehicle. In embodiments, sensors 120 may be brought into the vehicle by its drivers or passengers. As an example, a smartphone may be equipped with various sensors that may be used to measure air quality. The smartphone may then communicate with controllers 130 via sensor interface 140 regarding air quality either inside or outside of the vehicle compartment. In embodiments, sensors 120 may be selectively placed near an occupant to measure air quality indicators near the occupant. As an example, one or more sensors may be placed near a seat in a vehicle. In embodiments, sensors 120 may be selectively placed near a ventilation component (e.g., inlet/outlet) to measure air quality near the ventilation component. In embodiments, sensors 120 may be selectively placed external to vehicle compartment to measure air quality indicators of the ambient air space around the vehicle compartment. As an example, one or more sensors may be placed at locations on the exterior surfaces of the vehicle compartment. In embodiments, sensors 120 may be selectively placed in a mixed interior and exterior locations of the vehicle compartment.

In embodiments, controllers 130 may be configured to receive the measurements of the air quality indicators taken by sensor 120, and adaptively control ventilation components 110 to adjust airflow in the interior space of the vehicle compartment, based at least in part on the received measurements. In embodiments, controllers 130 may be configured to open or close ventilation components 110 to connect or disconnect air space of the interior space of the vehicle compartment with the ambient air space external to the vehicle compartment. In embodiments, controllers 130 may be configured to adjust the pathway or speed of airflow through the interior space of vehicle compartment. In embodiments, controllers 130 may be configured to remove air from the interior space of the vehicle compartment, or intake air into the interior space of the vehicle compartment, from the ambient air space external to the vehicle compartment. In embodiments, controllers 130 may be configured to operate ventilation components 110 in order to adjust the airflow in the interior space of the vehicle compartment. As an example, controllers 130 may be configured to operate ventilation components 110, such as inlets/outlets (e.g., adjust flaps or valves), closable openings (e.g., open or close windows), blowers/fans (e.g., change airflow), and/or other ventilation devices/structures.

In embodiments, the functionalities encompassed in controllers 130 may be carried out by various different components. As an example, a central air quality monitor (not illustrated in FIG. 1) may be used to collect data from sensor 120 and detect the location in the interior space of the vehicle compartment where the air quality has changed beyond a desirable threshold. As another example, airflow control agents (not illustrated in FIG. 1) may be selectively deployed to various ventilation locations of the vehicle compartment, and used to change settings of blowers/fans, open or close window, and/or adjust valves of inlets/outlets, under the command of the central air quality monitor. In other embodiments, other types of centralized or distributed components may be configured to carry out functions encompassed in controllers 130. In embodiments, controllers 130 may be integrated with the infotainment system of a vehicle.

In embodiments, apparatus 100 may be further configured with communication components (not shown) to communicate with a remote server or service via a wired or wireless network. In embodiments, apparatus 100 may be configured to communicate using numerous networking hardware and/or interfaces, e.g., modems, network interface controllers (NICs), wireless network interface controller (WNIC), to enable communication with computers on the same network and/or computers on a remote network through routable protocols, such as Internet protocols (IPs). In some embodiments, apparatus 100 may operate in accordance with suitable wireless communication protocols that require very low power such as BLUETOOTH®, ultra-wide band (UWB), and/or radio frequency identification (RFID) to implement wireless personal area network (WPAN). In some other embodiments, apparatus 100 may also enable communication via visible light, infrared, sonic, or other communication modes besides radio-based communication. In some other embodiments, apparatus 100 may also communicate via a user wireless device, e.g., a cellular phone, to communicate with a remote server or service.

In embodiments, the remote server or service may provide data processing services for apparatus 100. As an example, data collected by sensors 120 may need to be analyzed and processed in connection with historical data in order to determine the severity of air quality changes. In embodiments, the remote server or service may provide environmental information. Environmental information may include at least one of weather or air quality information of the ambient air space of the vehicle compartment. Environmental information may be used by controllers 130 in determining the manner to adjust airflow in the interior space of the vehicle compartment. As an example, severe weather may prohibit opening a window. As another example, air quality information around a paper mill may be suggestive for controllers 130 to disconnect the interior air space of the vehicle compartment with its ambient air space to prevent odor coming into the interior air space of the vehicle compartment.

Figure 2:
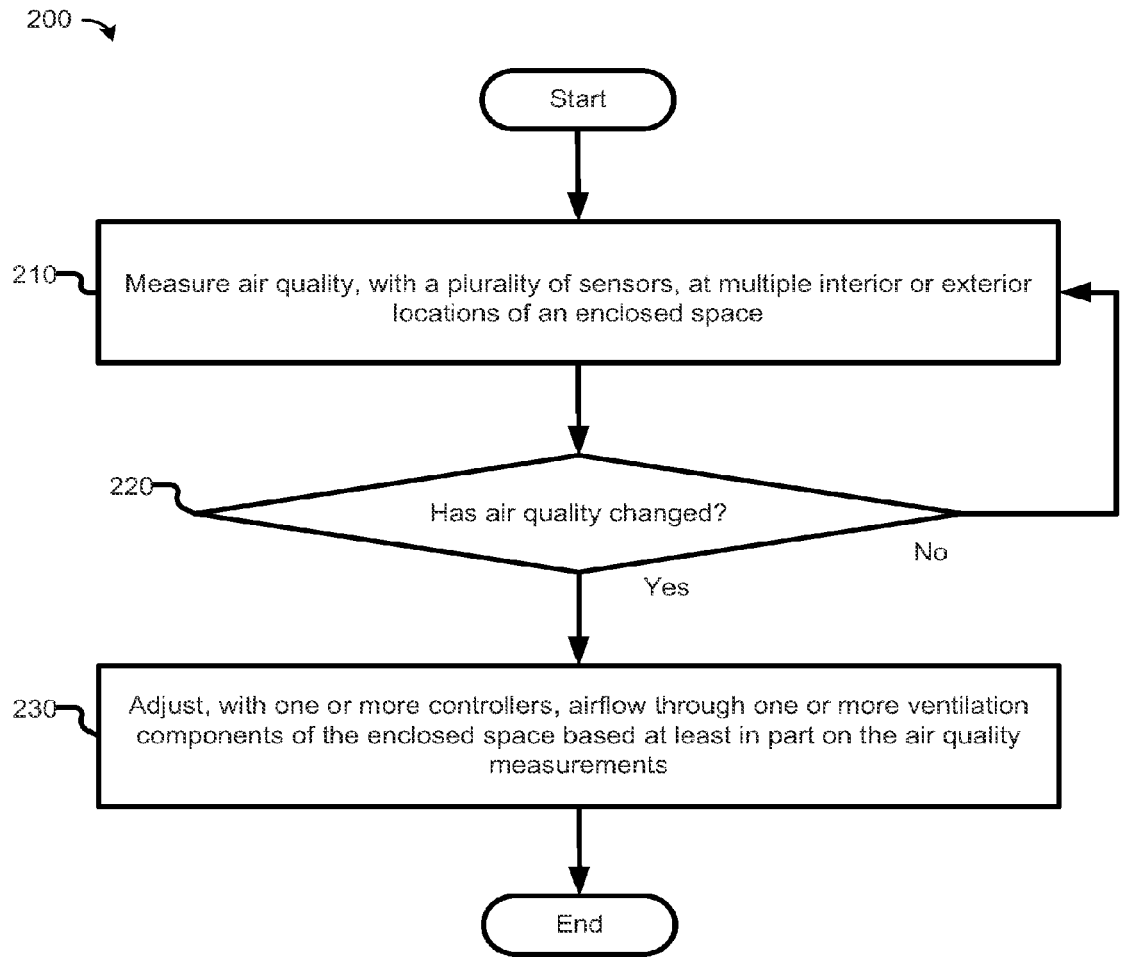
FIG. 2 is a flow diagram of an example air quality control process which may be practiced by an example apparatus, incorporating aspects of the present disclosure, in accordance with various embodiments.

Referring now to FIG. 2, it is a flow diagram of an example adaptive air quality control process which may be practiced by an example apparatus incorporating aspects of the present disclosure, in accordance with various embodiments. As shown, process 200 may be performed by apparatus 100 to implement one or more embodiments of the present disclosure. In embodiments, an apparatus incorporated with the teachings of this disclosure may detect pollutants and adaptively adjust the airflow of the interior space of a vehicle compartment to mitigate the spread of the pollutants or the time of presence of the pollutants, and thus may enhance passenger comfort with improved air quality.

In embodiments, the process may begin at block 210, where air quality indicators may be measured, e.g., by sensors 120, at multiple interior and/or exterior locations of an enclosed space, e.g., interior space of a vehicle compartment. In embodiments, air quality indicators may be related to necessary chemical elements in sustaining most terrestrial life, such as dioxygen ($O_2$). As an example, air quality may be considered deteriorated when dioxygen falls below a certain level and causes breathing issues. In embodiments, air quality indicators may be related to various pollutants, such as sulphur oxides, nitrogen oxides, carbon monoxide, volatile organic compounds, particulates, persistent free radicals, toxic metals, ammonia, odors, radioactive pollutants, etc. Pollutants may adversely affect health or cause chemical reactions. As an example, passengers in an automobile with poor air quality may experience one or more symptoms such as headache, wheezing, tiredness, coughing, sneezing, sinus congestion, dizziness, nausea, and irritation of the eyes, nose or throat. As another example, high concentration of carbon monoxide (CO) may result in seizure, coma, and fatality of residents in a home.

In embodiments, sensors may be brought in by drivers or passengers. In embodiments, sensors may be mounted to various interior and/or exterior locations of an enclosed space, e.g., a vehicle compartment. Each sensor may be configured to measure one or more air quality indicators. A sensor may be selectively placed in a particular location to measure the air quality at that particular location. In some embodiments, via multiple sensors, controllers 130 may not only detect the source of a type of pollutant, e.g., odor, but also trace the circulation pathways of the pollutant. As an example, sensors may be placed near each seat in an automobile. Sensors may then be able to detect proximately the source of an odor and its travel pathway.

Next, at block 220, whether air quality has been changed (beyond a threshold) may be determined, e.g., by controllers 130. In embodiments, air quality change may be positive or negative. In some embodiments, air quality may be deteriorated, for example, when some pollutants were detected by sensors 120, or certain pollution levels for some pollutants surpassed a baseline, to be further illustrated in connection with FIG. 3. As an example, a uniform system of measuring pollution levels for major air pollutants may be used to indicate the general air quality in the interior space of a vehicle compartment, such as the pollution standards index (PSI) or the air quality index (AQI). As another example, apparatus 100 may be configured with sensors 120 to measure air quality based on one or more interested pollutants, such as combustion by-products. In some embodiments, air quality may be improved, for example, when some pollutants were no longer detected by sensor 120, or certain pollution levels for some pollutants fall close or below a baseline, to be further illustrated in connection with FIG. 3. As an example, the smoke from a lit cigarette, pipe, or cigar may be removed from the interior space of a vehicle compartment after opening the sunroof of an automobile, and then sensor 120 may no longer detect those smoking by-products.

Next, at block 230, airflow may be adjusted through one or more ventilation components of the enclosed space based at least in part on the air quality measurements, e.g., by controllers 130. In embodiments, ventilation components 110 may include ventilation inlets/outlets, closable openings, blowers/fans, and/or other ventilation devices/structures. In embodiments, to adjust airflow, controllers 130 may be configured to connect or disconnect air space of the enclosed space of a vehicle compartment with the ambient air space external to the vehicle compartment. As an example, a constant through-flow of fresh outside air may be injected into an automobile in normal situation to keep the interior atmosphere pleasant even with all the windows shut. However, when sensor 120 detected unpleasant odors around the automobile, controllers 130 may shut off the valve of the inlet/outlet, thus insulate the enclosed space within the automobile from outside odors. On the other hand, once outside air quality returned to be normal, controller 130 may turn on the valve of the inlet, and allow fresh air coming into the automobile again.

In embodiments, to adjust airflow, controllers 130 may be configured to remove air from the enclosed space of the vehicle compartment or intake air from the ambient air space external to the vehicle compartment. As an example, alcohol may be detected by sensors 120 when a drunken passenger sitting on a back seat. Controllers 130 may then open one or more rear windows to remove air contaminated by alcohol, so that the driver on front could be saved from unpleasant odors.

In embodiments, controllers 130 may be configured to adjust the pathway or speed of airflow in the enclosed space of the vehicle compartment. As an example, controllers 130 may turn on or increase the speed of fans to change the pathway of airflow to remove smoke from the vehicle compartment. As another example, a young baby on an infant seat with gastro-oesophageal reflux (GOR/reflux) may generate certain unpleasant smell. Controllers 130 may increase the airflow of the ventilation system to let a filter absorb and remove the unpleasant smell.

In embodiments, controllers 130 may be configured to adjust airflow according to a predetermined user setting. As an example, persons with allergy or asthma symptoms may get much worse for even little pollution caused by certain pollutants. Such persons may be able to customize the reaction of controllers 130 based on their preference or their doctors' advice. In embodiments, controllers 130 may be configured to be overridable by a user of apparatus 100. As an example, upon detecting obnoxious odors in a boat, controllers 130 may be programmed to open a window as a first measure to remove the odors in the normal course. However, controllers 130 may be configured to be overridable if the passenger believes the outside temperature is too cold.

Figure 3:
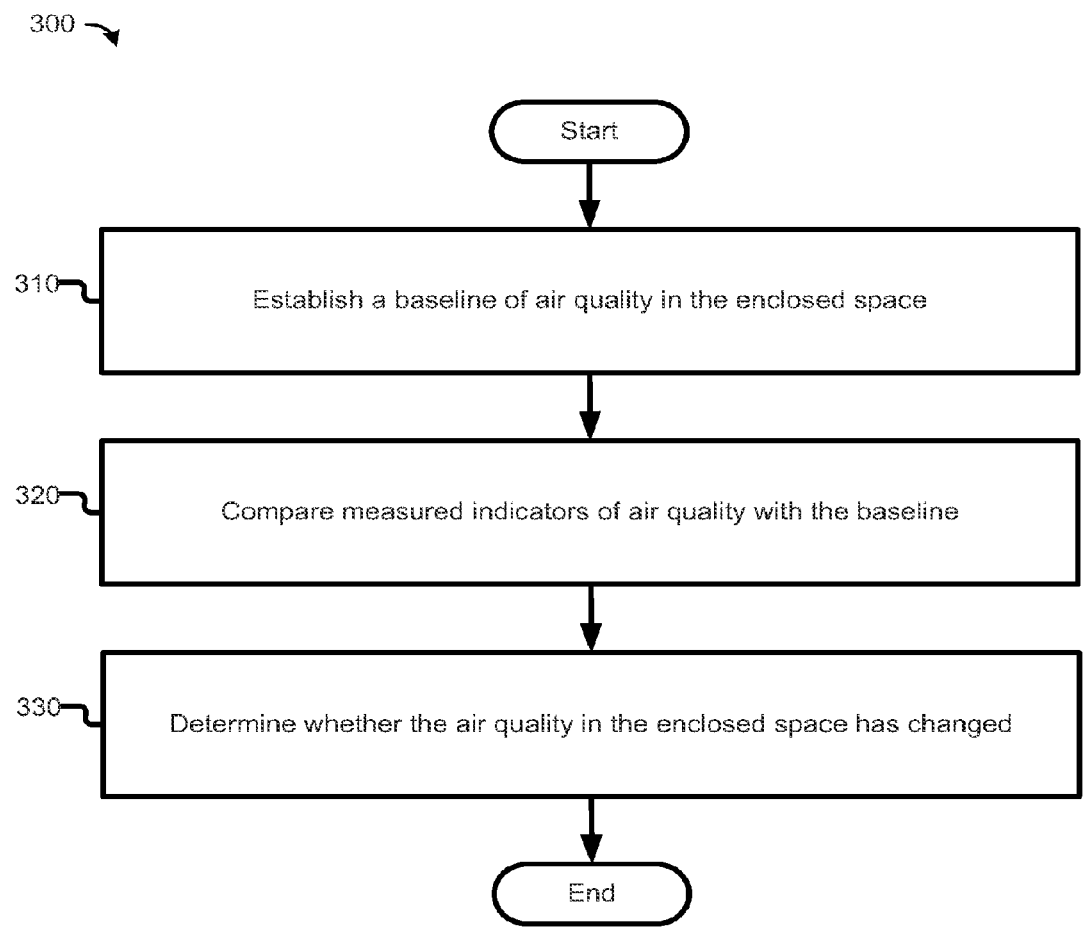
FIG. 3 is a flow diagram of an example air quality monitoring process which may be practiced by an example apparatus, incorporating aspects of the present disclosure, in accordance with various embodiments.

Referring now to FIG. 3, it is a flow diagram of an air quality monitoring process which may be practiced by an example apparatus, incorporating aspects of the present disclosure, in accordance with various embodiments. As shown, process 300 may be performed by apparatus 100 to implement one or more embodiments of the present disclosure. In embodiments, process 300 may be performed in reference to block 220 in FIG. 2.

In embodiments, the process may begin at block 310, where a baseline of air quality in the enclosed space may be established, e.g., by controllers 130. In embodiments, the baseline may refer to a set of measurements of air quality indicators that may be used as the basis for subsequent comparison. In embodiments, the set of measurements of air quality indicators may be associated with a set of threshold values. Therefore, any subsequent measurement within the threshold from the baseline may still be considered as normal.

In embodiments, the baseline may be predetermined for apparatus 100. As an example, a standard air quality index for city bus may be determined by a city council, promulgated through its rule making process, and implemented in each city bus. In embodiments, the baseline may be configured by a user of apparatus 100. As an example, a person with allergy or asthma symptoms may need to set a lower-than-normal baseline in order to enable apparatus 100 to response to even minor pollution.

In embodiments, the baseline may be established dynamically based on the condition of apparatus 100. As an example, when a vehicle starts, controllers 130 may collect the initial data from sensors 120, and establish a baseline based on the collected sensor data. As another example, while apparatus 100 moves from one location to another, controllers 130 may receive dynamically updated baselines based on its current location, e.g., from a remote server. For instance, when a truck moves from Colorado Mountains to Sonoran Desert, the baseline of air quality in the truck may be dynamically updated according to a weather service or a baseline database, stored locally or remotely.

Next, at block 320, measurements of the air quality indicators may be compared with the baseline, e.g., by controllers 130. In embodiments, the air quality indicators may be compared individually. As an example, the measurement of each interested pollutant may be compared with its baseline. In embodiments, air quality indicators may be compared as a composite index. As an example, the air quality in the interior space of a vehicle compartment may be computed into PSI, AQI, or a similar index.

Next, at block 330, a decision may be made for whether the air quality in the enclosed space has changed. In embodiments, air quality would be deemed as changed if at least one pollutant level went beyond the normal range based on its baseline level. In embodiments, air quality would be deemed as changed when the current measurement differs from the previous measurement more than a threshold. In embodiments, air quality change may be positive or negative, such as air quality deteriorated or improved. Responding to the change of air quality, controllers 130 may adjust airflow in the vehicle compartment, illustrated further in connection with FIG. 4.

Figure 4:
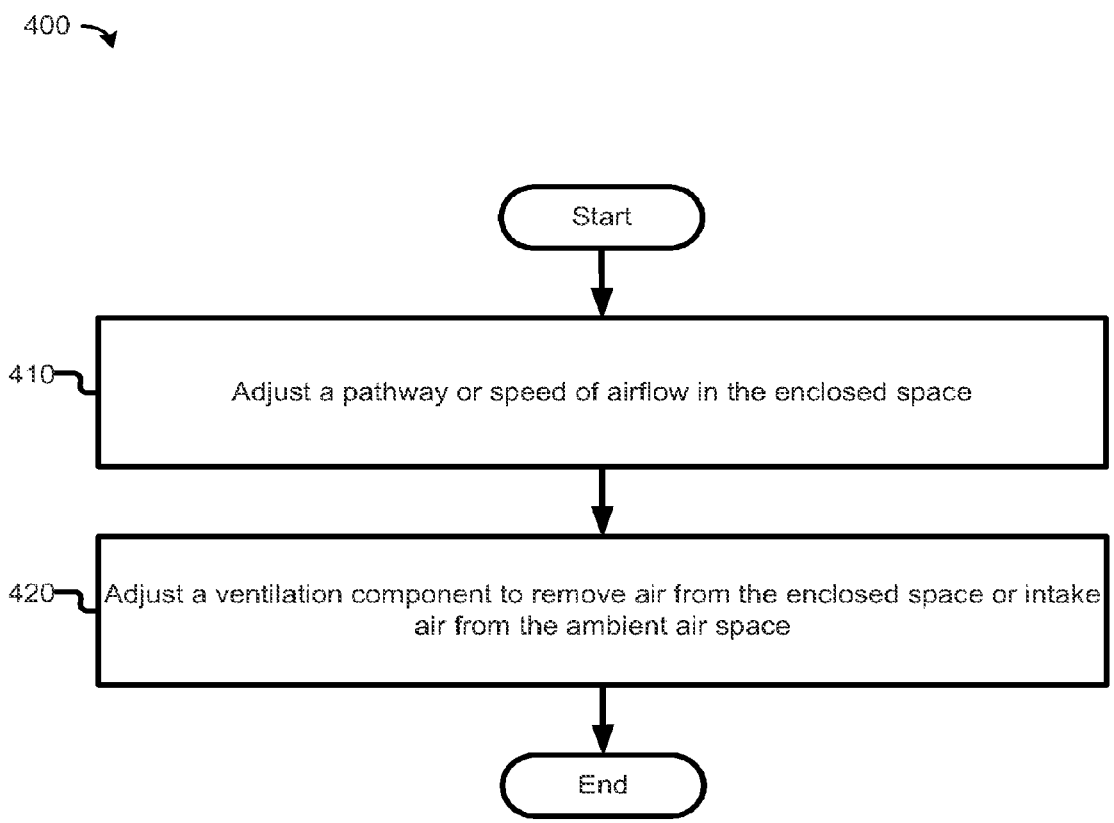
FIG. 4 is a flow diagram of an example airflow adjusting process which may be practiced by an example apparatus, incorporating aspects of the present disclosure, in accordance with various embodiments.

Referring now to FIG. 4, it is a flow diagram of an example adaptively airflow adjusting process that may be practiced by an example apparatus in accordance with various embodiments. As shown, process 400 may be performed by apparatus 100 to implement one or more embodiments of the present disclosure. In embodiments, controllers 130 may use one or more measures illustrated in connection with blocks 410 and 420 in any permutation to adjust the airflow in the interior space of a vehicle compartment.

In embodiments, the process may begin at block 410, where airflow pathways or speed of airflow in the enclosed space of the vehicle compartment may be adjusted, e.g., controlled by controllers 130. In embodiments, the vehicle compartment may form an air barrier system around its enclosed air space, and controllers 130 may be configured to change a pressure difference between any two points of the enclosed space and adjust the airflow pathways or speed of airflow between the points. As an example, controllers 130 may use mechanical equipment, such as fans or blowers, to adjust airflow pathways or speed of airflow in the interior space of a vehicle compartment. As another example, controllers 130 may use stack effect to adjust airflow pathways or speed of airflow movement in the interior space of a vehicle compartment, i.e., hot air rises and cold air sinks. Yet as another example, controllers 130 may use wind effect to adjust airflow pathways or speed of airflow in the interior space of a vehicle compartment. For instance, controllers 130 may leverage wind forces acting on the vehicle compartment to create a positive pressure on the windward side of the vehicle compartment and negative pressures on the other side of the vehicle compartment. In other embodiments, controllers 130 may use other means to adjust airflow pathways or speed of airflow in the interior space of a vehicle compartment. In embodiments, increased airflow passing through the air conditioning filter or cabin air filter in the ventilation system of a vehicle may remove many pollutants from the air, thus protecting the passengers inside the interior space of a vehicle compartment.

Next, at block 420, ventilation components 110 may be adjusted to remove air from the enclosed space of a vehicle compartment or intake air from the ambient air space, e.g., by the controllers 130. In embodiments, controllers 130 may adjust the damper, e.g., a valve or plate, of ventilation inlets/outlets of air handler, or other air handling equipment, to start, stop, or regulate the flow of air between the enclosed space of a vehicle compartment and its external ambient air space. In embodiments, controllers 130 may adjust closable openings, e.g., a window or sunroof, to start, stop, or regulate the flow of air between the enclosed space of a vehicle compartment and its external ambient air space. In embodiments, increased exchange of air between the enclosed space of a vehicle compartment and its external ambient air space may remove or dilute many pollutants from the enclosed space of a vehicle compartment, thus protecting the passengers inside a vehicle compartment.

In embodiments, controllers 130 may be configured to adjust a ventilation component proximately located to a sensor that first detected deteriorated air quality, e.g., when at least one indicator of air quality falls below its baseline. As an example, controllers 130 may open the back seat window that is closest to the sensor first detected the smell of alcohol, so that the smell may be prevented to circulate to other parts of the automobile.

In embodiments, controllers 130 may be configured to adjust a ventilation component proximately located to a sensor that detected the greatest change of air quality among all sensors. Continuing with the previous example, the smell of alcohol may be initially breathed out from a front seat passenger, but the sensor on the back of the automobile may detect the greatest change of air quality due to the effect of fans situated in the front. Controllers 130 may be configured, in this circumstance, to turn on an exhaustion fan on the back of the automobile or adjust a sunroof to quickly remove the smell from the automobile.

Figure 5:
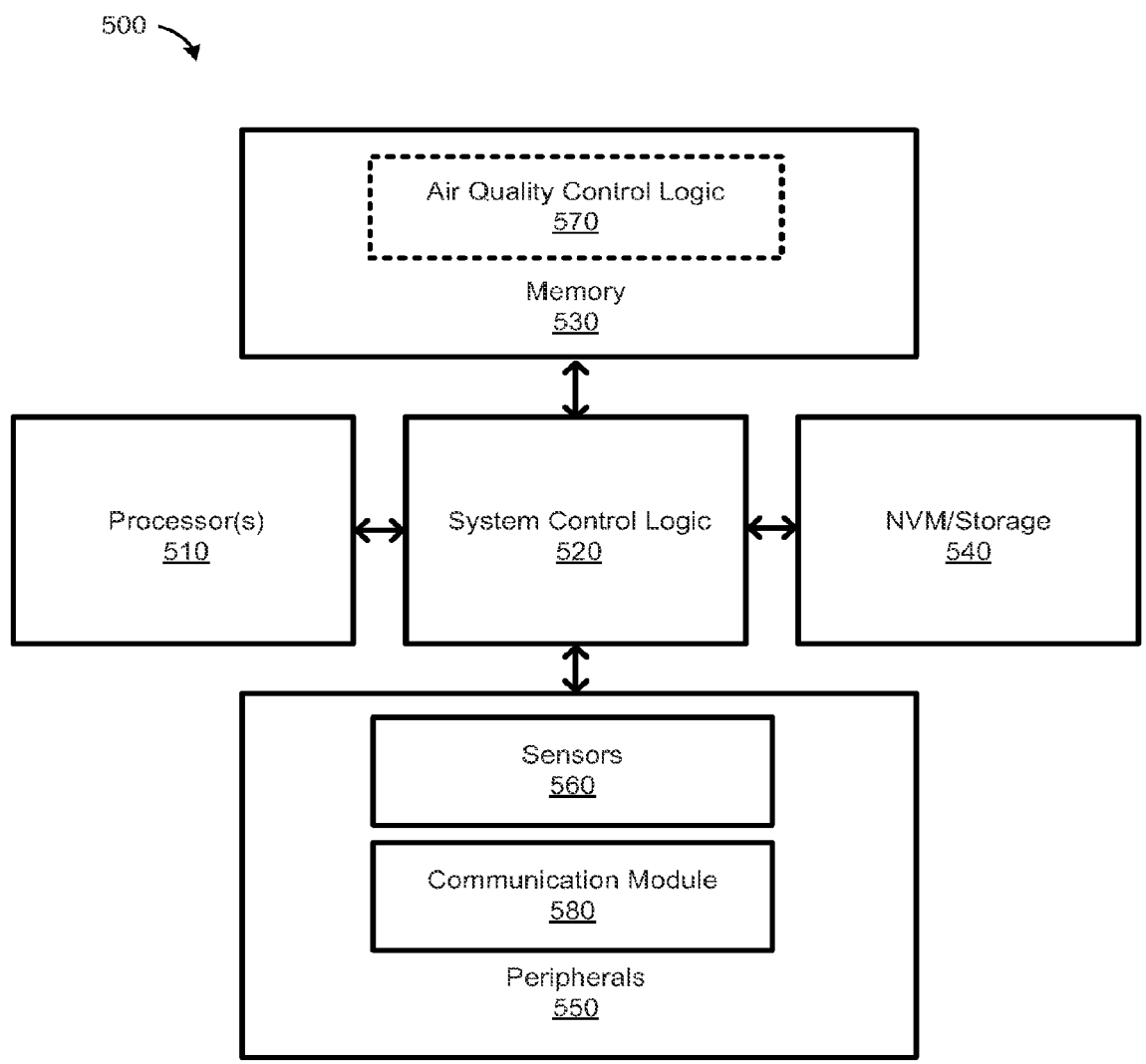
FIG. 5 illustrates an example computing device suitable for practicing the disclosed embodiments, in accordance with various embodiments.

FIG. 5 illustrates an embodiment of a computing device 500 suitable for practicing embodiments of the present disclosure. As illustrated, computing device 500 may include system control logic 520 coupled to one or more processor(s) 510, to system memory 530, to non-volatile memory (NVM)/storage 540, and to one or more peripherals 550. In various embodiments, the one or more processors 510 may include a processor core. In embodiments, peripherals 550 may also include one or more sensors 560, similar to earlier described sensors 120 in connection with FIG. 1, which may be stationarily or movably coupled with computing device 500.

In some embodiments, system control logic 520 may include any suitable interface controllers to provide for any suitable interface to the processor(s) 510 and/or to any suitable device or component in communication with system control logic 520. System control logic 520 may also interoperate with a display (not shown) for display of information, such as to a user. In various embodiments, the display may include one of various display formats and forms, such as, for example, liquid-crystal displays, cathode-ray tube displays, and e-ink displays. In various embodiments, the display may include a touch screen.

In some embodiments, system control logic 520 may include one or more memory controller(s) (not shown) to provide an interface to system memory 530. System memory 530 may be used to load and store data and/or instructions, for example, for computing device 500. System memory 530 may include any suitable volatile memory, such as suitable dynamic random access memory (DRAM), for example.

In some embodiments, system control logic 520 may include one or more input/output (I/O) controller(s) (not shown) to provide an interface to NVM/storage 540 and peripherals 550. NVM/storage 540 may be used to store data and/or instructions, for example. NVM/storage 540 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 540 may include a storage resource that is physically part of a device on which computing device 500 is installed or it may be accessible by, but not necessarily a part of, computing device 500. For example, NVM/storage 540 may be accessed by computing device 500 over a network via communication module 580.

In embodiments, system memory 530, NVM/storage 540, and system control logic 520 may include, in particular, temporal and persistent copies of air quality control logic 570. The air quality control logic 570 may include instructions that, when executed by at least one of the processor(s) 510, result in computing device 500 practicing one or more aspects of airflow control, such as, but not limited to, processes 200, 300, and 400, as well as other operations performed by controllers 130, described above.

Communication module 580 within peripherals 550 may provide an interface for computing device 500 to communicate over one or more network(s) and/or with any other suitable device. Communications module 580 may include any suitable hardware and/or firmware, such as a network adapter, one or more antennas, wireless interface(s), and so forth. In various embodiments, communication module 580 may include an interface for computing device 500 to use NFC, optical communications (e.g., barcodes), or other similar technologies to communicate directly (e.g., without an intermediary) with another device. In various embodiments, communication module 580 may interoperate with radio communications technologies such as, for example, WCDMA, GSM, LTE, BLUETOOTH®, ZIGBEE®, and the like. In embodiments, communication module 580 may include a sensor interface, similar to earlier described sensor interface 140 in connection with FIG. 1, which enables computing device 500 to communicate with sensors 560 that is stationarily or moveably coupled with computing device 500.

In some embodiments, at least one of the processor(s) 510 may be packaged together with system control logic 520 and/or air quality control logic 570. In some embodiments, at least one of the processor(s) 510 may be packaged together with system control logic 520 and/or air quality control logic 570 to form a System in Package (SiP). In some embodiments, at least one of the processor(s) 510 may be integrated on the same die with system control logic 520 and/or air quality control logic 570. In some embodiments, at least one of the processor(s) 510 may be integrated on the same die with system control logic 520 and/or air quality control logic 570 to form a System on Chip (SoC).

Depending on which modules of apparatus 100 (FIG. 2) are hosted by computing device 500, the capabilities and/or performance characteristics of processors 510, system memory 530, and so forth, may vary. In various implementations, computing device 500 may be integrated into a land vehicle, a watercraft, a sailcraft, an aircraft, a hovercraft, a spacecraft and/or any vehicle suitable for transporting passengers or cargo, enhanced with the teachings of the present disclosure. In particular, in embodiments, computing device 500 may also host the infotainment system of the vehicle.

Figure 6:
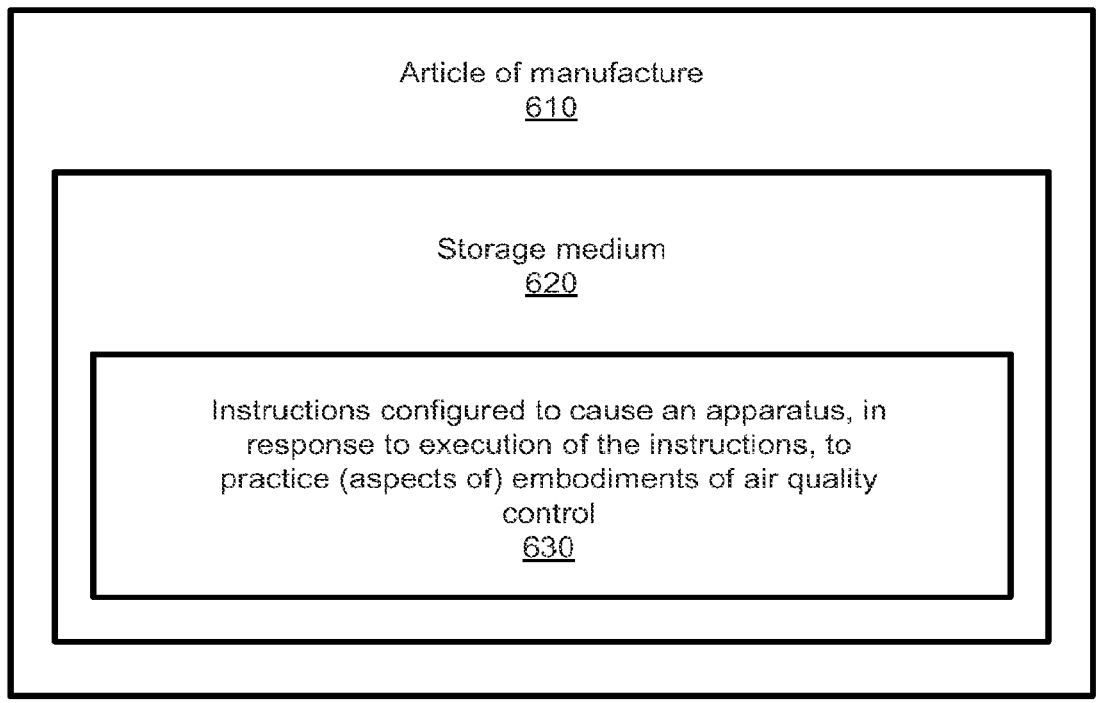
FIG. 6 illustrates an article of manufacture having programming instructions, incorporating aspects of the present disclosure, in accordance with various embodiments.

FIG. 6 illustrates an article of manufacture 610 having programming instructions, incorporating aspects of the present disclosure, in accordance with various embodiments. In various embodiments, an article of manufacture may be employed to implement various embodiments of the present disclosure. As shown, the article of manufacture 610 may include a computer-readable non-transitory storage medium 620 where instructions configured to practice embodiments of air quality control 630 reside. The storage medium 620 may represent a broad range of persistent storage medium known in the art, including but not limited to flash memory, dynamic random access memory, static random access memory, an optical disk, a magnetic disk, etc. Instructions 630 may enable an apparatus, in response to their execution by the apparatus, to perform various operations described herein. For example, storage medium 620 may include instructions 630 configured to cause an apparatus or system to practice some or all aspects of contextual display of the process 200 of FIG. 2, process 300 of FIG. 3, or process 400 of FIG. 4, in accordance with embodiments of the present disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for adaptively controlling interior air quality of a vehicle compartment which may include a plurality of sensors, disposed at a plurality of locations at a plurality of sides or in an interior space of the vehicle compartment, and configured to measure one or more indicators of air quality at the plurality of locations; and one or more airflow controllers, operatively coupled with the plurality of sensors, and configured to adaptively control a plurality of ventilation components of the vehicle compartment to regulate airflow in the interior space, based at least in part on the measured indicators of air quality.

Example 2 may include the subject matter of Example 1, and may further specify that the one or more airflow controllers may be configured to adjust one or more of the plurality of ventilation components to regulate airflow in the interior space, when at least one indicator of air quality is measured by at least one of the sensors to be below a baseline.

Example 3 may include the subject matter of Example 2, and may further specify that the one or more airflow controllers may be configured to adjust a ventilation inlet/outlet or a closable opening proximately located to a sensor that first measured the at least one indicator of air quality to be below the baseline.

Example 4 may include the subject matter of Example 2, and may further specify that the one or more airflow controllers may be further configured to establish the baseline for the indicators of air quality based at least in part on a set of previous measurements taken by the plurality of sensors.

Example 5 may include the subject matter of Examples 1-4, and further specifies that the one or more airflow controllers are further configured to adjust a ventilation inlet/outlet or a closable opening proximately located to a sensor that measured a greatest change of an indicator of air quality, among the plurality of sensors.

Example 6 may include the subject matter of Examples 1-5, and further specifies that the one or more airflow controllers may be further configured to open or close the closable openings to connect or disconnect air space of the interior space with exterior ambient air space.

Example 7 may include the subject matter of Examples 1-6, and further specifies that the one or more airflow controllers may be configured to adjust the plurality of ventilation components to adjust a pathway of airflow through the interior space.

Example 8 may include the subject matter of Examples 1-7, and further specifies that the one or more airflow controllers may be configured to adjust the plurality of ventilation components to adjust a speed of airflow through the interior space.

Example 9 may include the subject matter of Examples 1-8, and further specifies that the one or more airflow controllers may be configured to adjust a ventilation component to allow air flow out of the interior space.

Example 10 may include the subject matter of Examples 1-9, and further specifies that the plurality of sensors may be further configured to measure indicators of air quality of ambient air space at a plurality of exterior locations on the plurality of sides of the vehicle compartment.

Example 11 may include the subject matter of Examples 1-10, and further specifies that the one or more airflow controllers may be configured to adjust one or more of the plurality of ventilation components to regulate airflow into the enclosed interior space, based at least in part on the measured indicators of air quality of ambient air space at the plurality of exterior locations.

Example 12 may include the subject matter of Examples 1-11, and further specifies that the one or more airflow controllers may be configured to adjust one or more of the plurality of ventilation components to regulate airflow into the interior space based at least in part on environmental information of ambient airspace, wherein the environmental information includes weather information.

Example 13 may include the subject matter of Examples 1-12, and further specifies that the one or more airflow controllers may be configured to adjust one or more of the plurality of ventilation components to regulate airflow in the enclosed interior space based at least in part on a preference setting of a passenger.

Example 14 may include the subject matter of Examples 1-13, and further specifies that the one or more airflow controllers may be configured to be overridable by a passenger.

Example 15 may include the subject matter of Examples 1-14, and further specifies that the plurality of sensors may be configured to measure levels of a plurality of pollutants.

Example 16 may include the subject matter of Example 15, and further specifies that the plurality of pollutants comprises sulphur oxides, nitrogen oxides, carbon monoxide, volatile organic compounds, particulates, persistent free radicals, toxic metals, ammonia, odors, or radioactive pollutants.

Example 17 may include the subject matter of Examples 1-16, and further specifies that the interior space may include interior space of a vehicle compartment of a vehicle that is a selected one of a car, a truck, a bus, a train, or a motorhome, and the ventilation components may include windows or sunroofs of the vehicle compartment.

Example 18 may include the subject matter of Example 17, and further specifies that the apparatus may be integrated with the infotainment system of the vehicle compartment.

Example 19 is a method for adaptively controlling interior airflow of a vehicle compartment which may include determining, with one or more airflow controllers, whether the air quality at one or more locations at a plurality of sides or interior space of a vehicle compartment has changed, based at least in part on measurements of air quality indicators taken with a plurality of sensors disposed at the one or more locations; and in response to measured changes to the air quality at the one or more locations, adaptively adjusting one or more ventilation components of the vehicle compartment, with the one or more airflow controllers, to regulate airflow in the interior space, based at least in part on the measured changes.

Example 20 may include the subject matter of Example 19, and further specifies that the adjusting may include adjusting the one or more ventilation components of the vehicle compartment, with the one or more airflow controllers, to connect or disconnect airspace of the interior space of the vehicle compartment with ambient air space external to the vehicle compartment.

Example 21 may include the subject matter of Examples 19-20, and further specifies that the adjusting may include adjusting the one or more ventilation components of the vehicle compartment, with the one or more airflow controllers, to change a pathway of airflow through the interior space.

Example 22 may include the subject matter of Examples 19-21, and further specifies that the adjusting may include adjusting the one or more ventilation components of the compartment, with the one or more airflow controllers, to change a speed of airflow through the interior space.

Example 23 may include the subject matter of Examples 19-22, and further specifies that the adjusting may include adjusting the one or more ventilation components with the one or more airflow controllers, when one or more air quality indicators of at least one of the one or more locations are measured to be below a baseline.

Example 24 may include the subject matter of Examples 19-23, and further specifies that the adjusting may include adjusting a ventilation component proximately located to a sensor that first measured air quality to be below the baseline.

Example 25 may include the subject matter of Examples 23-24, and further includes establishing, with the one or more controllers, the baseline, based at least in part on a set of previous measurements taken by the plurality of sensors.

Example 26 may include the subject matter of Examples 19-25, and further specifies that the adjusting may include adjusting a ventilation component proximately located to a sensor that measured a greatest amount of change, among the plurality of sensors.

Example 27 may include the subject matter of Examples 19-26, and further specifies that the adjusting may include adjusting a ventilation component with the one or more airflow controllers to allow air flow out of the interior space.

Example 28 may include the subject matter of Examples 19-27, and further includes measuring the air quality indicators, with the plurality of sensors.

Example 29 may include the subject matter of Example 28, and further specifies that the plurality of sensors may be first plurality of sensors, and the method may further include measuring, with a second plurality of sensors, air quality indicators of ambient air space external to the interior space of the vehicle compartment.

Example 30 may include the subject matter of Example 29, and further specifies that adjusting may be further based on a result of the measuring of air quality indicators of ambient air space exterior to the vehicle compartment.

Example 31 may include the subject matter of Examples 19-30, and further includes receiving, by the one or more airflow controllers, environmental information of ambient air space from a service, wherein the environmental information comprises at least one of weather or air quality information.

Example 32 may include the subject matter of Example 31, and further specifies that adjusting may be further based on the environmental information.

Example 33 may include the subject matter of Examples 19-32, and further specifies that the air quality indicators may include indicators of levels of a plurality of pollutants.

Example 34 may include the subject matter of Examples 19-33, and further specifies that the one or more airflow controllers may be part of an infotainment system of the vehicle, and wherein closable openings of the vehicle may include windows or sunroofs of the vehicle.

Example 35 is a storage medium having stored therein instructions configured to cause a device, in response to execution of the instructions by the device, to practice any one of the adaptive air quality control methods of 19-34. The storage medium may be non-transient.

Example 36 is an apparatus for adaptively controlling interior air quality of a vehicle compartment which may include means for practicing any one of the adaptive air quality control methods of 19-34.

What is claimed is:

1. An apparatus, comprising:
   a sensor interface to interface with a plurality of sensors, wherein the plurality of sensors are disposed at one or more locations at one or more sides or in an interior space of a vehicle compartment and measure one or more indicators of air quality at the one or more locations; and
   one or more airflow controllers, operatively coupled with the sensor interface, to adaptively control a plurality of ventilation components of the vehicle compartment to regulate airflow in the interior space using, at least in part, a wind force acting on the vehicle compartment; wherein
   to adaptively control is based at least in part on the measured indicators of air quality, wherein the plurality of ventilation components comprise a window or sunroof, wherein the sensor interface measures a travel pathway of airflow in the vehicle compartment based on a measurement of an air quality indicator occurring at successive sensors of the plurality of sensors, and wherein the airflow controllers control the plurality of ventilation components of the vehicle compartment to regulate airflow in the interior space to affect the air quality indicator along the travel pathway.

2. The apparatus according to claim 1, wherein the one or more airflow controllers are able to adjust one or more of the plurality of ventilation components to regulate airflow in the interior space, when at least one indicator of air quality is measured by at least one of the sensors to be below a baseline.

3. The apparatus according to claim 2, wherein the one or more airflow controllers are able to adjust at least one of the ventilation components proximately located to a sensor that first measured the at least one indicator of air quality to be below the baseline.

4. The apparatus according to claim 2, wherein the one or more airflow controllers are able to establish the baseline for the indicators of air quality based at least in part on a set of previous measurements taken by the plurality of sensors.

5. The apparatus according to claim 1, wherein the one or more airflow controllers are able to adjust at least one of the ventilation components proximately located to a sensor that measured a greatest change of an indicator of air quality, among the plurality of sensors.

6. The apparatus according to claim 1, wherein the one or more airflow controllers are able to open or close at least one of the ventilation components to connect or disconnect air space of the interior space with exterior ambient air space.

7. The apparatus according to claim 1, wherein the one or more airflow controllers adjust the plurality of ventilation components to adjust a pathway of airflow through the interior space using the wind force acting on the vehicle compartment to create a positive pressure on a windward side of the vehicle compartment and a negative pressure on a non-windward side of the vehicle compartment.

8. The apparatus according to claim 1, wherein the one or more airflow controllers are able to adjust a ventilation component of the plurality of ventilation components to allow airflow out of the interior space.

9. The apparatus according to claim 1, wherein the plurality of sensors are a first plurality of sensors, and the sensor interface is able to interface the first plurality of sensors and with a second plurality of sensors to measure indicators of air quality of ambient air space at a plurality of exterior locations on the one or more sides of the vehicle compartment.

10. The apparatus according to claim 9, wherein the one or more airflow controllers adjust one or more of the plurality of ventilation components to regulate airflow into the interior space, based at least in part on the measured indicators of air quality of ambient air space at the plurality of exterior locations.

11. The apparatus according to claim 1, wherein the one or more airflow controllers adjust one or more of the plurality of ventilation components to regulate airflow into the interior space based at least in part on environmental information of ambient air space, wherein the environmental information includes weather information.

12. The apparatus according to claim 1, wherein the one or more airflow controllers adjust one or more of the plurality of ventilation components to regulate airflow in the interior space based at least in part on a preference setting of a passenger.

13. The apparatus according to claim 1, wherein the plurality of sensors are able to measure levels of a plurality of pollutants, and wherein the plurality of pollutants comprises sulphur oxides, nitrogen oxides, carbon monoxide, volatile organic compounds, particulates, persistent free radicals, toxic metals, ammonia, odors, or radioactive pollutants.

14. The apparatus according to claim 1, wherein the vehicle compartment is of a car, a truck, a bus, a train, or a motorhome.

15. A method, comprising:
determining, with one or more airflow controllers, whether an air quality at one or more locations at a plurality of sides or interior space of a vehicle compartment has changed, based at least in part on measurements of air quality indicators taken with a plurality of sensors disposed at the one or more locations;
determining a travel pathway of airflow in the vehicle compartment based on a measurement of an air quality indicator occurring at successive sensors of the plurality of sensors; and
in response to measured changes to the air quality at the one or more locations, adaptively adjusting one or more ventilation components of the vehicle compartment, with the one or more airflow controllers, to regulate airflow along the travel pathway in the interior space using, at least in part, a wind force acting on the vehicle compartment, and based at least in part on the measured changes; wherein the one or more ventilation components comprise a window or sunroof.

16. The method of claim 15, wherein adjusting comprises adjusting the one or more ventilation components with the one or more airflow controllers, when one or more air quality indicators of at least one of the one or more locations are measured to be below a baseline.

17. The method of claim 16, wherein adjusting comprises adjusting a ventilation component of the one or more ventilation components proximately located to a sensor that first measured air quality to be below the baseline.

18. The method of claim 16, further comprising:
establishing, with the one or more controllers, the baseline, based at least in part on a set of previous measurements taken by the plurality of sensors.

19. The method of claim 15, wherein the plurality of sensors are a first plurality of sensors, and the method further comprises:
measuring, with a second plurality of sensors, air quality indicators of ambient air space external to the interior space of the vehicle compartment, and wherein adjusting is further based on a result of the measuring of air quality indicators by the second plurality of sensors.

20. The method of claim 15, further comprising:
receiving, by the one or more airflow controllers, environmental information of ambient air space from a service, wherein the environmental information comprises at least one of weather or air quality information, and wherein adjusting is further based on the environmental information.

21. At least one non-transitory storage medium comprising a plurality of instructions to cause an air quality control system, in response to execution of the instructions by the system, to:
determine, with one or more airflow controllers, whether an air quality at one or more locations at a plurality of sides or interior space of a vehicle compartment has changed, based at least in part on a set of measurements of air quality indicators taken with a plurality of sensors disposed at the one or more locations;
determine a travel pathway of airflow in the vehicle compartment based on successive measurements of an air quality indicator in the set of measurements of air quality indicators occurring at successive locations of the plurality of sensors; and
in response to measured changes to the air quality in the travel pathway of airflow, adaptively adjust one or more ventilation components of the vehicle compartment, with the one or more airflow controllers, to regulate airflow in the travel pathway of airflow, based at least in part on the measured changes.

22. The storage medium of claim 21, wherein adjust comprises adjust the one or more ventilation components of the vehicle compartment, with the one or more airflow controllers, to change the travel pathway of airflow using, at least in part, a wind force acting on the vehicle compartment.

* * * * *